US010357795B2

United States Patent
O'Hare et al.

(10) Patent No.: US 10,357,795 B2
(45) Date of Patent: Jul. 23, 2019

(54) METHOD AND APPARATUS FOR FORMING ARTICLES WITH NON-UNIFORMLY PATTERNED COATINGS

(71) Applicant: 3M INNOVATIVE PROPERTIES COMPANY, St. Paul, MN (US)

(72) Inventors: Jonathan J. O'Hare, Oakdale, MN (US); Tyler J. Rattray, Minneapolis, MN (US); Mikhail L. Pekurovsky, Bloomington, MN (US); Peter T. Benson, North St. Paul, MN (US); Ann M. Gilman, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/755,114

(22) PCT Filed: Aug. 24, 2016

(86) PCT No.: PCT/US2016/048336
§ 371 (c)(1),
(2) Date: Feb. 26, 2018

(87) PCT Pub. No.: WO2017/035203
PCT Pub. Date: Mar. 2, 2017

(65) Prior Publication Data
US 2018/0236481 A1 Aug. 23, 2018

Related U.S. Application Data

(60) Provisional application No. 62/210,044, filed on Aug. 26, 2015.

(51) Int. Cl.
*B05C 9/06* (2006.01)
*B01D 67/00* (2006.01)
(Continued)

(52) U.S. Cl.
CPC .............. *B05C 9/06* (2013.01); *B01D 53/228* (2013.01); *B01D 67/0088* (2013.01);
(Continued)

(58) Field of Classification Search
None
See application file for complete search history.

(56) References Cited

U.S. PATENT DOCUMENTS

| 3,039,893 A | 6/1962 | Banigan |
| 3,426,754 A | 2/1969 | Bierenbaum |

(Continued)

FOREIGN PATENT DOCUMENTS

| CN | 203695312 U | 7/2014 |
| WO | WO 01/76772 A2 | 10/2001 |

(Continued)

OTHER PUBLICATIONS

Mukhopadhyay, "A Review on Designing the Waterproof Breathable Fabrics Part I: Fundamental Principles and Designing Aspects of Breathable Fabrics", Journal of Industrial Textiles, Jan. 2008, vol. 37, No. 3, pp. 225-262.

(Continued)

*Primary Examiner* — Michael P. Rodriguez
(74) *Attorney, Agent, or Firm* — James A. Baker

(57) ABSTRACT

A process for applying a coating material onto a substrate as a non-uniform patterned layer of coating material, the method including providing a first distribution manifold having a cavity and a first multiplicity of dispensing outlets in fluid communication with the cavity, providing a second distribution manifold having a cavity and a second multiplicity of dispensing outlets in fluid communication with the cavity, creating relative motion between a substrate and the dispensing outlets in a first direction, dispensing a first coating material from the first dispensing outlets while (Continued)

maintaining the relative motion and simultaneously translating the plurality of dispensing outlets in a second direction non-parallel to the first direction, and dispensing a second coating material from the second dispensing outlets while maintaining the relative motion and simultaneously translating the plurality of dispensing outlets in a second direction non-parallel to the first direction. Useful non-uniformly patterned coated articles can be prepared using the process.

7 Claims, 10 Drawing Sheets

(51) Int. Cl.
    *B05C 5/02*     (2006.01)
    *B01D 53/22*     (2006.01)
    *B05D 1/26*     (2006.01)

(52) U.S. Cl.
    CPC .............. *B05C 5/025* (2013.01); *B05C 5/027* (2013.01); *B05D 1/26* (2013.01); *B01D 2053/221* (2013.01); *B01D 2323/42* (2013.01)

(56) References Cited

U.S. PATENT DOCUMENTS

| | | | |
|---|---|---|---|
| 3,532,589 A | 10/1970 | David | |
| 4,411,215 A | 10/1983 | Gailey | |
| 5,317,035 A | 5/1994 | Jacoby | |
| 5,374,477 A | 12/1994 | Lawless | |
| 5,593,771 A | 1/1997 | Lawless | |
| 5,895,301 A | 4/1999 | Porter | |
| 5,972,147 A | 10/1999 | Janis | |
| 6,033,064 A * | 3/2000 | Pawlowski, Jr. | ........ B41J 2/175 347/87 |
| 6,390,106 B1 * | 5/2002 | Lin | ..................... B05B 13/0468 134/172 |
| 6,495,229 B1 | 12/2002 | Carte | |
| 6,901,712 B2 | 6/2005 | Lionel | |
| 2001/0019340 A1 | 9/2001 | Kubo | |
| 2003/0082308 A1 | 5/2003 | Kinoshita et al. | |
| 2004/0180195 A1 | 9/2004 | Macuga | |
| 2005/0028938 A1 | 2/2005 | Hill | |
| 2005/0214496 A1 | 9/2005 | Borenstein | |
| 2005/0241574 A1 | 11/2005 | Schneider | |
| 2008/0170092 A1 | 7/2008 | Ishida | |
| 2011/0097499 A1 | 4/2011 | Park | |

FOREIGN PATENT DOCUMENTS

| | | |
|---|---|---|
| WO | WO 2011-087657 | 7/2011 |
| WO | WO 2011-159276 | 12/2011 |
| WO | WO 2013-090575 | 6/2013 |
| WO | WO 2013-116082 | 8/2013 |
| WO | WO 2015/126645 A1 | 8/2015 |

OTHER PUBLICATIONS

International Search Report for PCT International Application No. PCT/US2016/048336, dated Nov. 3, 2016, 3 pages.

* cited by examiner

METHOD AND APPARATUS FOR FORMING ARTICLES WITH NON-UNIFORMLY PATTERNED COATINGS

CROSS REFERENCE TO RELATED APPLICATIONS

This application is a national stage filing under 35 U.S.C. 371 of PCT/US2016/048336, filed Aug. 24, 2016, which claims the benefit of U.S. Application No. 62/210,044, filed Aug. 26, 2015, the disclosure of which is incorporated by reference in its/their entirety herein.

TECHNICAL FIELD

The present disclosure relates generally to the application of coatings to substrates, and more particularly to the application of non-uniform patterned coatings to flexible substrates.

BACKGROUND

The fabrication of numerous commercial products includes the step of applying a coating to a substrate in the form of a sheet or a web of indefinite length. For some applications it is desirable to have an overall uniform coating on the substrate, while in others it is desirable to apply a non-uniform coating in the form of, e.g., a multiplicity of stripes. The non-uniform coating may be applied directly to the substrate or to an intermediate surface with subsequent transfer to the substrate, or may be applied superimposed over an earlier uniform coating on the substrate. For example, the use of needle tubes to apply stripes of a coating material to a coating roll has been described, for example in Maier, PCT Patent Publication WO2011/087657.

SUMMARY

In one aspect, the present disclosure describes a method of applying a coating material onto a substrate, including providing a first distribution manifold having a cavity and a first multiplicity of dispensing outlets in fluid communication with the cavity, providing a second distribution manifold having a cavity and a second multiplicity of dispensing outlets in fluid communication with the cavity, creating relative motion between a substrate and the dispensing outlets in a first direction, dispensing a first coating material from the first dispensing outlets while maintaining the relative motion and simultaneously translating the plurality of dispensing outlets in a second direction non-parallel to the first direction, and dispensing a second coating material from the second dispensing outlets while maintaining the relative motion and simultaneously translating the plurality of dispensing outlets in a second direction non-parallel to the first direction.

In a second aspect, the present disclosure describes a method of applying a coating material to a substrate, including providing a first distribution manifold having a cavity and a first multiplicity of dispensing outlets in fluid communication with the cavity, creating relative motion between a substrate and the dispensing outlets in a first direction, dispensing a first coating material from the first dispensing outlets onto the substrate while maintaining the relative motion and simultaneously translating the plurality of dispensing outlets in a second direction non-parallel to the first direction, and while maintaining the relative motion, translating the plurality of dispensing outlets in a third direction non-parallel to the first and second directions.

In some exemplary embodiments of the foregoing method, the second plurality of dispensing outlets is interleaved with the first plurality of dispensing outlets. In these or other embodiments, the first dispensing outlets are translated in a third direction non-parallel to the first direction and non-parallel to the second direction while dispensing coating material from the first dispensing outlets. In some of the embodiments where the first dispensing outlets are translated in a third direction, the second dispensing outlets are translated in a third direction non-parallel to the first direction and non-parallel to the second direction while dispensing coating material from the second dispensing outlets. In some of these embodiments, the second and third directions are substantially orthogonal to each other.

In some embodiments, the first direction is a machine direction, and the second direction is a cross direction. In some of these embodiments, the third direction is substantially orthogonal to a major surface of the substrate.

In some exemplary embodiments of the foregoing method, the substrate has a non-uniform surface and the translation in the third direction keeps the first dispensing outlets at a substantially constant height above the non-uniform surface as the substrate moves past the first dispensing outlets. In these or other embodiments, the translation in the second and third directions causes the first coating material to be dispensed onto the substrate in the form of a plurality of ellipses, arcs, polygons, Lissajous figures, or a combination thereof. In some of the embodiments where the first coating material is dispensed onto the substrate in the form of a plurality of ellipses, the plurality of ellipses are a plurality of circles. In some of these embodiments, the polygons have between 3 and 12 sides.

In some convenient embodiments, the distribution manifold may be separated into a manifold chamber containing the cavity, and a removable cartridge having the plurality of needle tubes. In some embodiments, at least one of the first plurality of dispensing outlets or the second plurality of dispensing outlets comprises a plurality of hollow needle tubes. In some of these latter embodiments, the hollow needle tubes are flexible. In some of such embodiments, wherein the flexible hollow needle tubes comprise metal, thermoplastic polymer, thermoset polymer, fused silica, or a combination thereof.

In some convenient embodiments, the coating material applied to the substrate forms a single layer pattern. In some convenient embodiments, the coating material applied to the substrate forms a dual layer pattern. In some embodiments, the first and second coating materials are different materials.

In a third aspect, the present disclosure describes a coated article prepared according to any of the preceding methods, wherein the coated article is selected from an air barrier membrane, an adhesive tape, a paint masking film, or a drug delivery patch. In some exemplary embodiments, the coated article includes a substrate having a major surface extending in a longitudinal direction between a first longitudinal edge and a second longitudinal edge, and a cross direction between the edges; a first coating that is continuous in the longitudinal direction and discontinuous in the cross direction, disposed on the major surface in a first pattern that varies relative to the longitudinal edges; and a second coating that is continuous in the longitudinal direction and discontinuous in the cross direction, disposed on the substrate in a second pattern.

Listing of Exemplary Embodiments

A. A method of applying a coating material to a substrate, comprising:

providing a first distribution manifold having a cavity and a first plurality of dispensing outlets in fluid communication with the cavity;

providing a second distribution manifold having a cavity and a second plurality of dispensing outlets in fluid communication with the cavity; and creating relative motion between a substrate and the dispensing outlets in a first direction;

dispensing a first coating material from the first dispensing outlets onto the substrate while maintaining the relative motion, and simultaneously translating the plurality of dispensing outlets in a second direction non-parallel to the first direction; and dispensing a second coating material from the second dispensing outlets onto the substrate while maintaining the relative motion, and simultaneously translating the plurality of dispensing outlets in a second direction non-parallel to the first direction.

B. The method according to embodiment A wherein the second plurality of dispensing outlets is interleaved with the first plurality of dispensing outlets.

C. The method according to embodiments A or B wherein the first dispensing outlets are translated in a third direction non-parallel to the first direction and non-parallel to the second direction while dispensing coating material from the first dispensing outlets.

D. The method according to embodiment C wherein the second dispensing outlets are translated in a third direction non-parallel to the first direction and non-parallel to the second direction while dispensing coating material from the second dispensing outlets.

E. The method according to embodiments C or D wherein the second and third directions are substantially orthogonal to each other.

F. The method according to any preceding embodiment wherein the first direction is a machine direction, and the second direction is a cross direction.

G. The method according to embodiment F, wherein the third direction is substantially orthogonal to a major surface of the substrate.

H. A method of applying a coating material to a substrate, comprising:

providing a first distribution manifold having a cavity and a first plurality of dispensing outlets in fluid communication with the cavity;

creating relative motion between a substrate and the dispensing outlets in a first direction;

dispensing a first coating material from the first dispensing outlets onto the substrate while maintaining the relative motion and simultaneously translating the plurality of dispensing outlets in a second direction non-parallel to the first direction, and translating the plurality of dispensing outlets in a third direction non-parallel to the first and second directions.

I. The method according to any one of embodiments C-H wherein the substrate has a non-uniform surface and wherein the translation in the third direction keeps the first dispensing outlets at a substantially constant height above the non-uniform surface as the substrate moves past the first dispensing outlets.

J. The method according to any one of embodiments C-I wherein the translation in the second and third directions causes the first coating material to be dispensed onto the substrate in the form of a plurality of ellipses, arcs, polygons, Lissajous figures, or a combination thereof.

K. The method according to embodiment J wherein the plurality of ellipses are a plurality of circles.

L. The method according to embodiment K wherein the polygons have between 3 and 12 sides.

M. The method according to any one of the preceding embodiments wherein the distribution manifold may be separated into a manifold chamber containing the cavity, and a removable cartridge having the plurality of needle tubes.

N. The method according to any one of the preceding embodiments wherein at least one of the first plurality of dispensing outlets or the second plurality of dispensing outlets comprises a plurality of hollow needle tubes.

O. The method according to embodiment N wherein the hollow needle tubes are flexible.

P. The method according to embodiment O wherein the flexible hollow needle tubes comprise metal, thermoplastic polymer, thermoset polymer, fused silica, or a combination thereof.

Q. The method according to any one of the preceding embodiments wherein the coating material applied to the substrate forms a single layer pattern.

R. The method according to any one of the preceding embodiments wherein the coating material applied to the substrate forms a dual layer pattern.

S. The method according to any one of embodiments 1-7 wherein the first and second coating materials are different materials.

T. A coated article prepared according to the method of any one of the preceding embodiments wherein the coated article is selected from an air barrier membrane, an adhesive tape, a paint masking film, or a drug delivery patch.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

Figure 1:
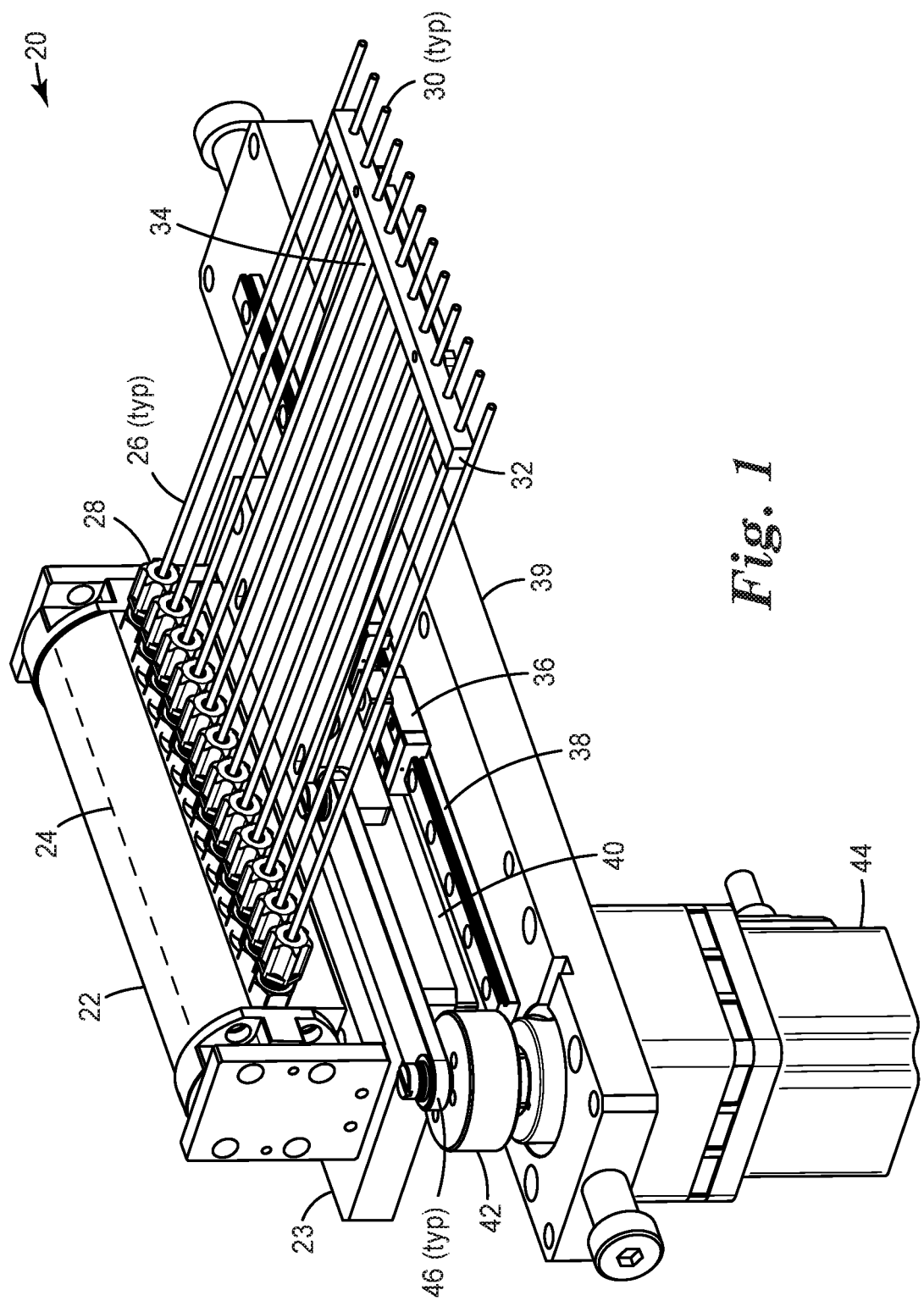
FIG. 1 is a perspective view of a coating apparatus for applying a single layer patterned coating.

In the drawings, like reference numerals indicate like elements. While the above-identified drawings, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

Recently, the use of needle tubes to apply stripes of coating material to a coating roll was disclosed in co-pending and co-assigned PCT Patent Publication WO2011/087657. Other coating apparatus making use of needle tubes were disclosed in co-pending and co-assigned PCT Patent Publication WO2011/159276 and PCT Patent Publication WO2013/090575.

The present disclosure describes coating methods including dispensing coating material from a plurality of dispensing outlets while simultaneously translating the plurality of dispensing outlets. In convenient embodiments, the plurality of dispensing outlets is at the distal ends of needle tubes in fluid communication with the cavity of a distribution manifold.

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should understood that, as used herein:

The term "homogeneous" means exhibiting only a single phase of matter when observed at a macroscopic scale.

The terms "(co)polymer" or "(co)polymers" includes homopolymers and copolymers, as well as homopolymers or copolymers that may be formed in a miscible blend, e.g., by coextrusion or by reaction, including, e.g., transesterification. The term "copolymer" includes random, block and star (e.g. dendritic) copolymers.

The term "(meth)acrylate" with respect to a monomer, oligomer or means a vinyl-functional alkyl ester formed as the reaction product of an alcohol with an acrylic or a methacrylic acid.

The term "adjoining" with reference to a particular layer means joined with or attached to another layer, in a position wherein the two layers are either next to (i.e., adjacent to) and directly contacting each other, or contiguous with each other but not in direct contact (i.e., there are one or more additional layers intervening between the layers).

By using terms of orientation such as "atop", "on", "over," "covering", "uppermost", "underlying" and the like for the location of various elements in the disclosed coated articles, we refer to the relative position of an element with respect to a horizontally-disposed, upwardly-facing substrate. However, unless otherwise indicated, it is not intended that the substrate or articles should have any particular orientation in space during or after manufacture.

By using the term "overcoated" to describe the position of a layer with respect to a substrate or other element of an article of the present disclosure, we refer to the layer as being atop the substrate or other element, but not necessarily contiguous to either the substrate or the other element.

By using the term "separated by" to describe the position of a layer with respect to other layers, we refer to the layer as being positioned between two other layers but not necessarily contiguous to or adjacent to either layer.

The terms "about" or "approximately" with reference to a numerical value or a shape means +/− five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

As used in this specification and the appended embodiments, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but is to be controlled by the limitations set forth in the claims and any equivalents thereof.

Exemplary Coating Apparatus and Processes

Various exemplary embodiments of the disclosure will now be described with particular reference to the Drawings.

Referring to FIG. 1, a perspective view of a coating apparatus 20 suitable for carrying out the methods of the present disclosure is illustrated. The coating apparatus 20 includes a distribution manifold 22 on a support 23. Distribution manifold 22 has a cavity 24 internally (rendered in dotted lines in this Figure). A plurality of needle tubes 26 is in fluid communication with cavity 24. In some convenient embodiments, the distribution manifold 22 can be separated into a manifold chamber containing the cavity, and a removable cartridge having the plurality of needle tubes. Quick release fittings 28 are provided for convenience in cleaning the apparatus 20 between uses, and also to conveniently change the width of the coated pattern to be generated by the apparatus. Quick release fittings from Swagelok of Solon, Ohio are considered suitable. Coating material is supplied to the cavity 24 via an inlet port (on the far side in this view) from a pump.

Needle tubes 26 end in a plurality of dispensing outlets 30, by extension also in fluid communication with the cavity 24. In some embodiments such as the one illustrated, the dispensing outlets 30 form an array. The array may be linear as illustrated in this Figure, but non-linear arrays may be convenient for some purposes. In some convenient embodiments, the dispensing outlets 30 are evenly spaced along the distribution manifold 22, but non-uniform spacing may also be convenient, e.g. when the article coated by apparatus 20 is to be slit in a downstream operation into several portions.

In the illustrated embodiment, the spacing between the needle tubes 26, and by extension the dispensing outlets 30, is secured by an alignment bar 32. Alignment bar 32 is conveniently attached to a plate 34 which is in turn attached to a slide 36. Slide 36 is slideably mounted on a track 38 attached to a frame 39. The motion of slide 36 along track 38 is controlled by a bar 40 pivotally mounted on slide 36. The other end of bar 40 is pivotally mounted on rotor 42, which can be rotated by motor 44. Rotor 42 has several attachment holes 46 at diverse distances from the axis of rotation of motor 44. Though this mechanism, the slide 36 can be placed in reciprocating motion by activating motor 44. By the choice of which attachment hole 46 is selected for the attachment of bar 40, the amplitude of the reciprocating motion is easily changed. The frequency of the reciprocating motion is easily controlled by the speed setting selected for motor 44.

In some convenient embodiments, needle tubes can be hollow. In some convenient embodiments, the needle tubes can be flexible. In some convenient embodiments, materials that can be formed into hollow conduits, such as metal, polymers (e.g., thermoplastic polymer, thermoset polymer), fused silica, or a combination thereof, can be used. In some embodiments, the needle tubes are conveniently made from stainless steel. Further, in embodiments such as the one illustrated in FIG. 1 which includes alignment bar 32 and rigid plate 34, it is possible to use non-rigid materials such as silicone rubber tubing to form needle tubes 26.

Figure 2:
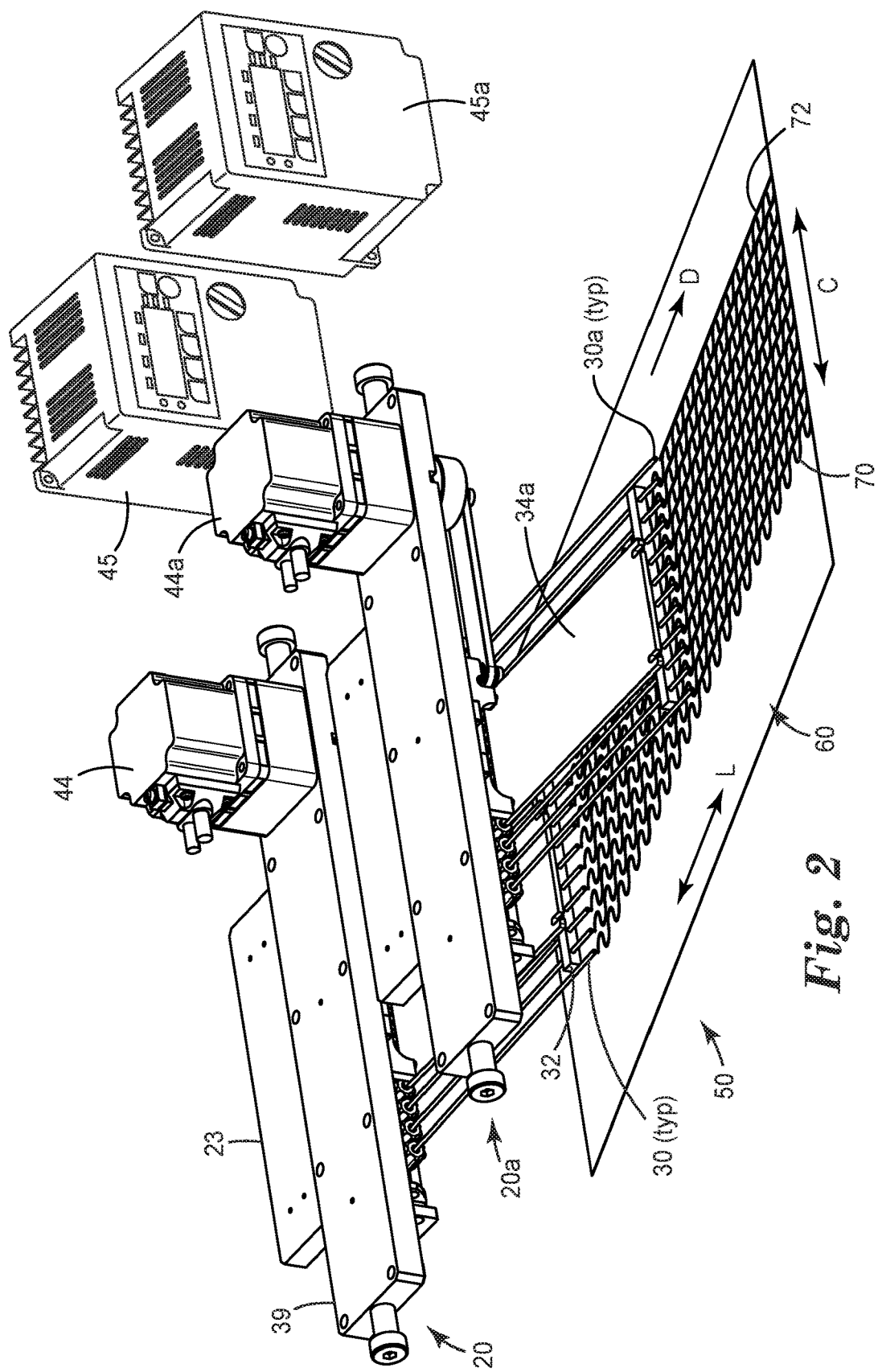
FIG. 2 is a perspective view of a coating apparatus for applying a dual layer patterned coating

Referring now to FIG. 2, a dual coating apparatus 50 is illustrated. Dual coating apparatus 50 includes a first distribution manifold 20 and a second distribution manifold 20a. Conveniently, distribution manifold 20 and a second distribution manifold 20a are both constructed as described in FIG. 1, although there is no necessity when there are two or more distribution manifolds for them to be similar. In this Figure, motor controllers 45 and 45a, which control and power motors 44 and 44a on first distribution manifold 20 and second distribution manifold 20a, respectively, are shown. First distribution manifold 20 and a second distribution manifold 20a have first and second dispensing outlets 30 and 30a respectively, positioned adjacent to a substrate 60.

The substrate 60 has a longitudinal direction "L" and a cross direction "C". In this Figure, substrate 60 is being conveyed past dispensing outlets 30 and 30a in a first direction "D". No specific means for conveying the substrate 60 is critical to the utility of the present disclosure, and in general any of the diverse mechanisms known to artisans for this purpose will suffice. While substrate 60 is being conveyed, the first plurality of dispensing outlets 30 is simultaneously translated in a second direction that is non-parallel to the first direction. This is accomplished by operating motor 44 to move alignment bar 32. In the depicted embodiment, that second direction conveniently happens to be identical to cross direction "C," but this identity is not critical to the utility of the present disclosure.

The combination of the movement of substrate 60 in direction "D" while first plurality of dispensing outlets 30 is reciprocated in the "C" direction causes first coating material being dispensed from first plurality of dispensing outlets 30 to be laid onto substrate 60 in sinusoidal patterns 70. Reciprocation rates of between about 0.16 Hz to 6.16 Hz have been found to be convenient. In this Figure, second plurality of dispensing outlets 30a is not being reciprocated, which causes second coating material being dispensed from second plurality of dispensing outlets 30a to be laid onto substrate 60 in straight patterns 72.

Figure 3:
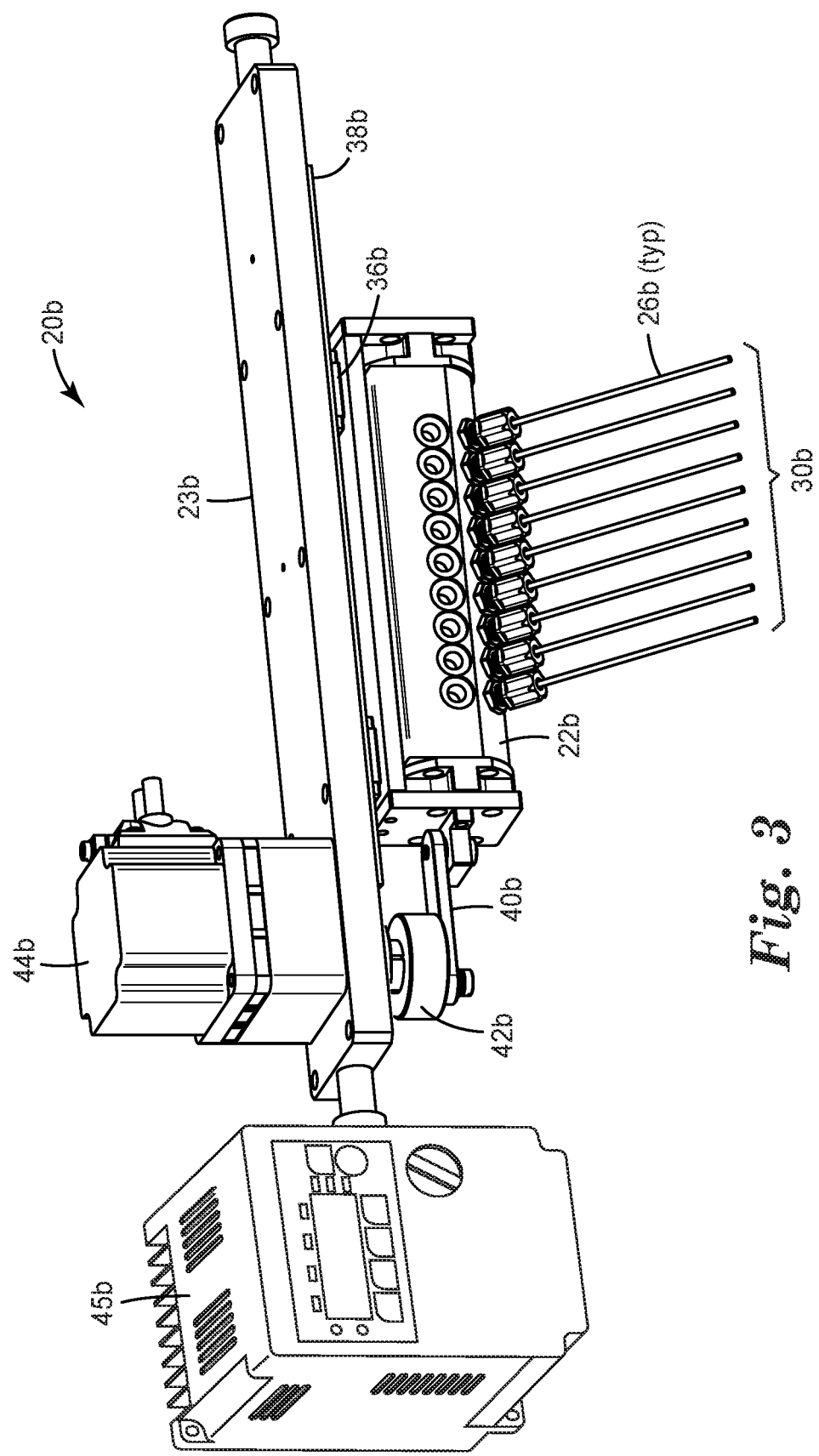
FIG. 3 is a perspective view of an alternative coating apparatus for applying a single layer patterned coating.

Referring now to FIG. 3, a perspective view of an alternative coating apparatus 20b is illustrated. Coating apparatus 20b is similar in some ways to coating apparatus 20 of FIG. 1, except that the entire distribution manifold 22b is mounted onto slide 36b, which is itself slidably mounted to track 38b on support 23b. When motor controller 45b operates motor 44b, turning rotor 42b, bar 40b reciprocates distribution manifold 22b directly. This in turn reciprocates needle tubes 26b and thereby reciprocates dispensing outlets 30b. This variant may be convenient when the total displacement in the second direction is low, or the speed of conveying the substrate is slower.

A rotor and bar mechanism as depicted in FIGS. 1-3 is not the only mechanism contemplated for translating the dispensing outlets. For example, a stepper motor could be connected by a mechanism to either the distribution manifold or to an alignment bar. A linear displacement transducer could be employed similarly. Such alternatives could be synchronized to the conveying speed of the substrate so that complex non-sinusoidal patterns could be laid down for the first and/or second coating material.

Figure 4:
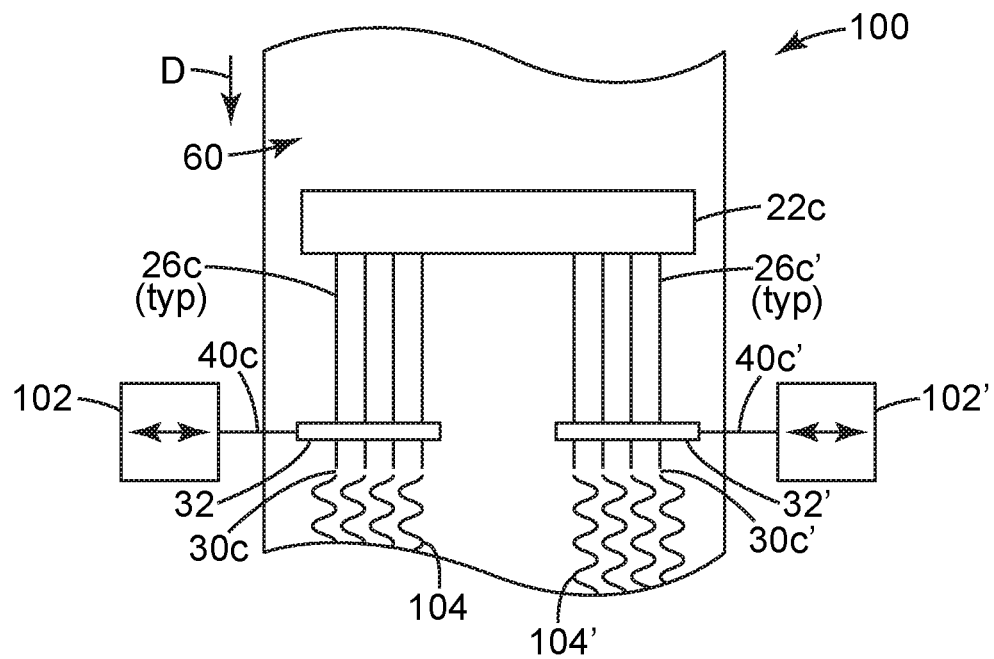
FIG. 4 is a stylized plan view of an alternative coating apparatus useful in practicing certain embodiments of the present disclosure.

Referring now to FIG. 4, a stylized plan view of an alternate embodiment of a coating apparatus 100 is illustrated. In this embodiment, needle tubes 26c and 26c' both extend from distribution manifold 22c. Alignment bars 32 and 32' are conveniently present so that dispensing outlets 30c and 30c' are conveniently moved as two groups. Alignment bars 32 and 32' are respectively connected to bars 40c and 40c', and mechanisms 102 and 102' which move the dispensing outlets 30c and 30c' in a predetermined pattern to dispense coating material 104 and 104' onto substrate 60. The predetermined patterns may, but need not be coordinated with each other. One or both may, but need not be periodic or contain periodic portions.

Figure 5:
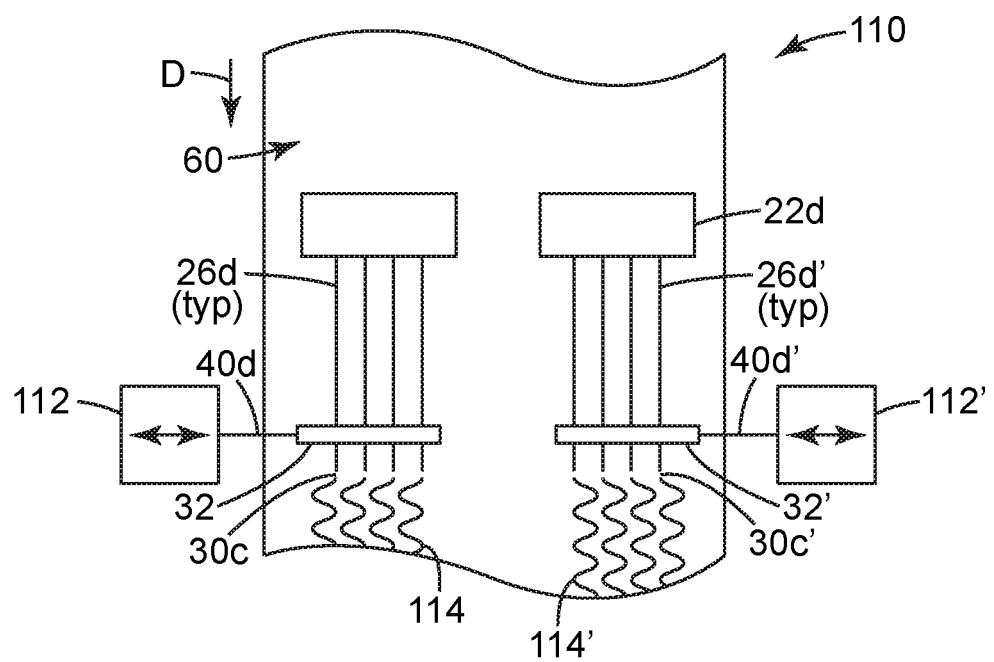
FIG. 5 is a stylized plan view of another alternative coating apparatus useful in practicing additional embodiments of the present disclosure.

Referring now to FIG. 5, a stylized plan view of an alternate embodiment of a coating apparatus 110 is illustrated. In this embodiment, needle tubes 26d and 26d' both extend separately from distribution manifolds 22d and 22d. Alignment bars 32 and 32' are conveniently present so that dispensing outlets 30d and 30d' are conveniently moved as two groups. Alignment bars 32 and 32' are respectively connected to bars 40d and 40d', and mechanisms 112 and 112' which move the dispensing outlets 30d and 30d' in a predetermined pattern to dispense coating material 114 and 114' onto substrate 60. The predetermined patterns may, but need not be coordinated with each other. One or both may, but need not be periodic or contain periodic portions. When using this embodiment, it is frequently convenient to dispense different coating materials from distribution manifolds 22d and 22d.

Figure 6:
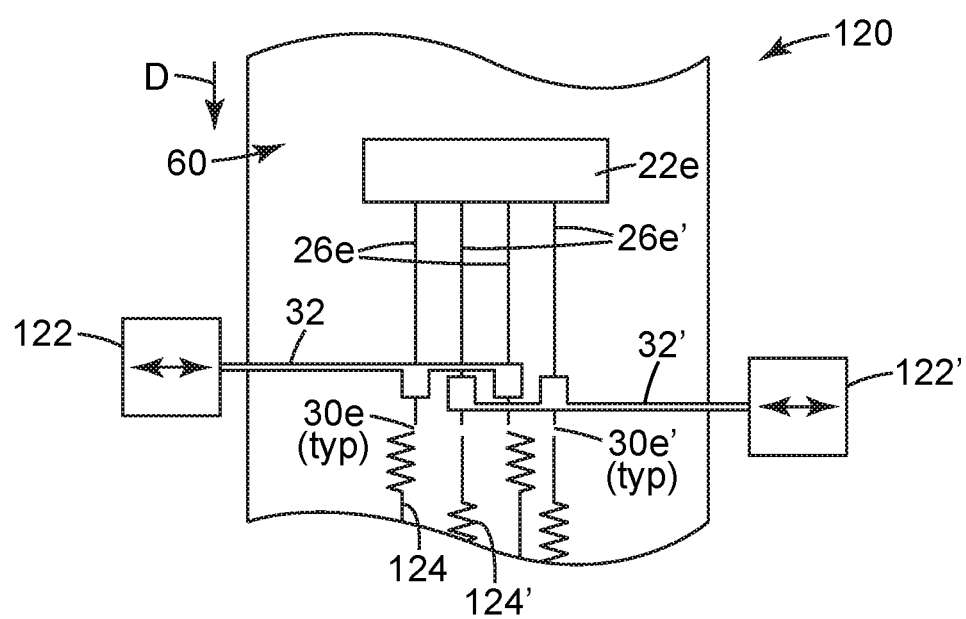
FIG. 6 is a stylized plan view of an additional alternative coating apparatus useful in practicing further embodiments of the present disclosure.

Referring now to FIG. 6, a stylized plan view of an alternate embodiment of a coating apparatus 120 is illustrated. In this embodiment, needle tubes 26e and 26e' both extend separately from distribution manifold 22e. Alignment bars 32 and 32' are conveniently present so that dispensing outlets 30e and 30e' are conveniently moved as two groups, even though they are interleaved. Alignment bars 32 and 32' are respectively connected to mechanisms 122 and 122' which move the dispensing outlets 30e and 30e' in a predetermined pattern to dispense coating material 124 and 124' onto substrate 60. The predetermined patterns may, but need not be coordinated with each other. One or both may, but need not be periodic or contain periodic portions.

Figure 7:
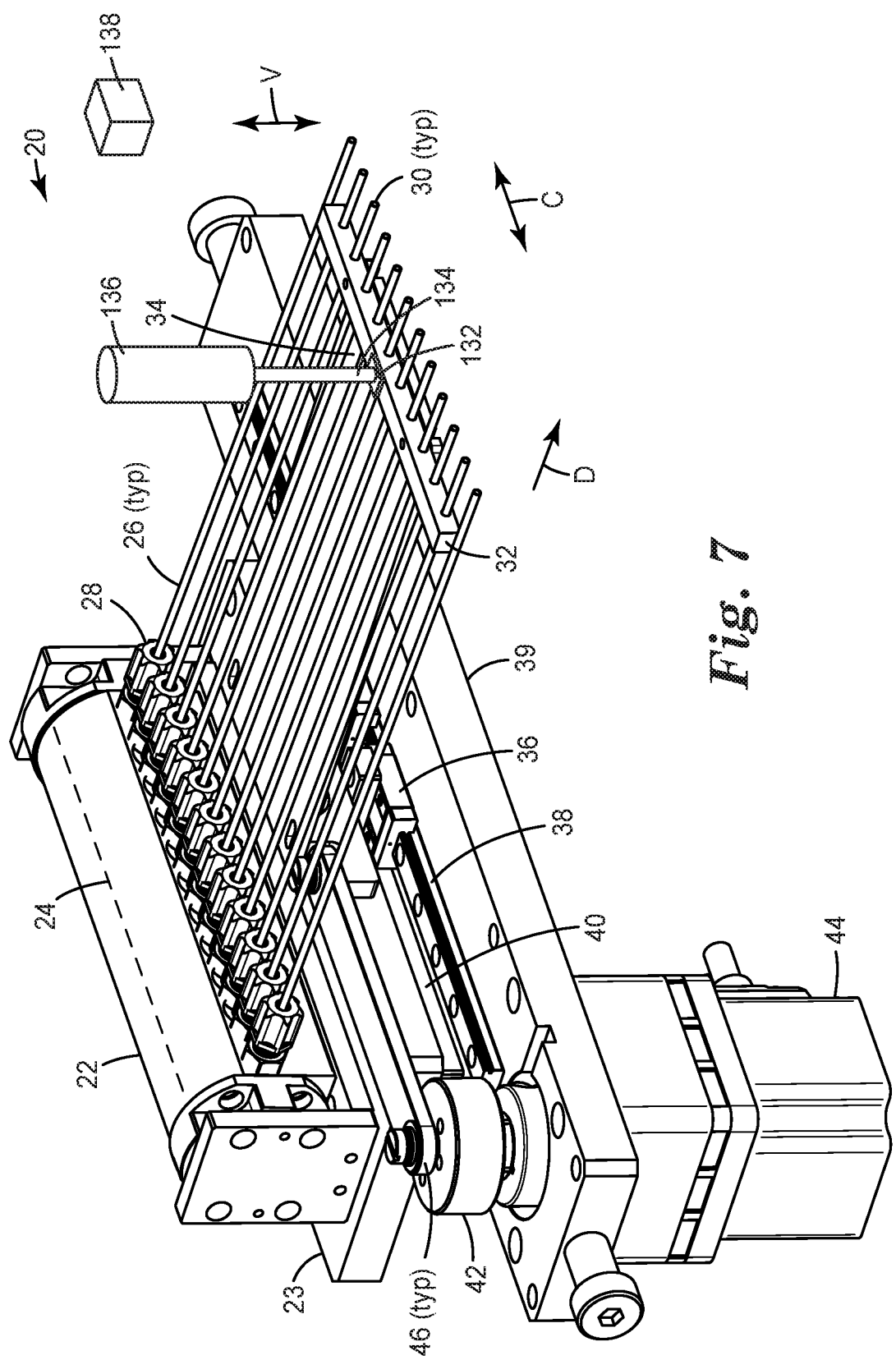
FIG. 7 is a perspective view of a coating apparatus useful in practicing certain embodiments of the present disclosure wherein the dispensing outlets are translated in two directions.

Referring now to FIG. 7, a perspective view of a coating apparatus 130 where the dispensing outlets 30 are translated in two directions is illustrated. Coating apparatus 130 is similar in many ways to the apparatus 20 of FIG. 1, but in this case the alignment bar 32 includes a attachment point 132 connected to a mechanism to translate the alignment bar 32, and inherently the first dispensing outlets 30, in a third direction "V" non-parallel to the first direction "D" and non-parallel to the second direction "C" while dispensing coating material from the first dispensing outlets 30. In some embodiments, the translation in the third direction keeps the first dispensing outlets 30 at a substantially constant height above the surface of the substrate as the substrate moves past the first dispensing outlets 30. In the illustrated embodiment, the first direction "D" is the machine direction, the second direction "C" is conveniently the cross-direction of the web, and the third direction "V" is conveniently orthogonal to both the machine direction and the cross direction. While the artisan will understand that numerous mechanisms will be suitable for the purpose of translating the alignment bar 32, in the illustrated embodiment the attachment point 132 is connected to the driven arm 134 of a linear actuator 136, conveniently controlled by motor controller 138.

Relative movement between the substrate 60 and the dispensing outlets 30 can be at a constant rate, a periodic rate, or a random rate. While in many convenient embodiments the substrate 60 will be conveyed at a steady speed relative to the dispensing outlets 30 in traditional roll-to-roll manufacturing, this is not a requirement of the invention. For one thing, the substrate 60 could be moved in an intermittent, or even temporarily in a reversed direction to allow, e.g. circles or ovals of coating material to be dispensed. In a few convenient embodiments, the substrate can be conveyed and the substrate 60 could be moved at the same time, In a few convenient embodiments, the substrate is not conveyed at all, and relative movement in the first direction, the second direction, or the third direction is provided entirely by movement of the dispensing outlets.

Figure 8:
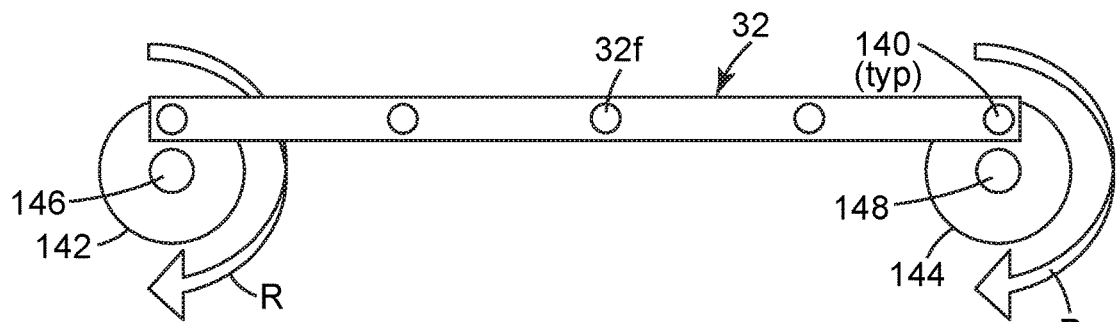
FIG. 8 is a stylized front view of a mechanism for translating an alignment bar in two directions simultaneously useful in practicing certain embodiments of the present disclosure wherein the dispensing outlets are translated in two directions simultaneously.
Figure 9A:
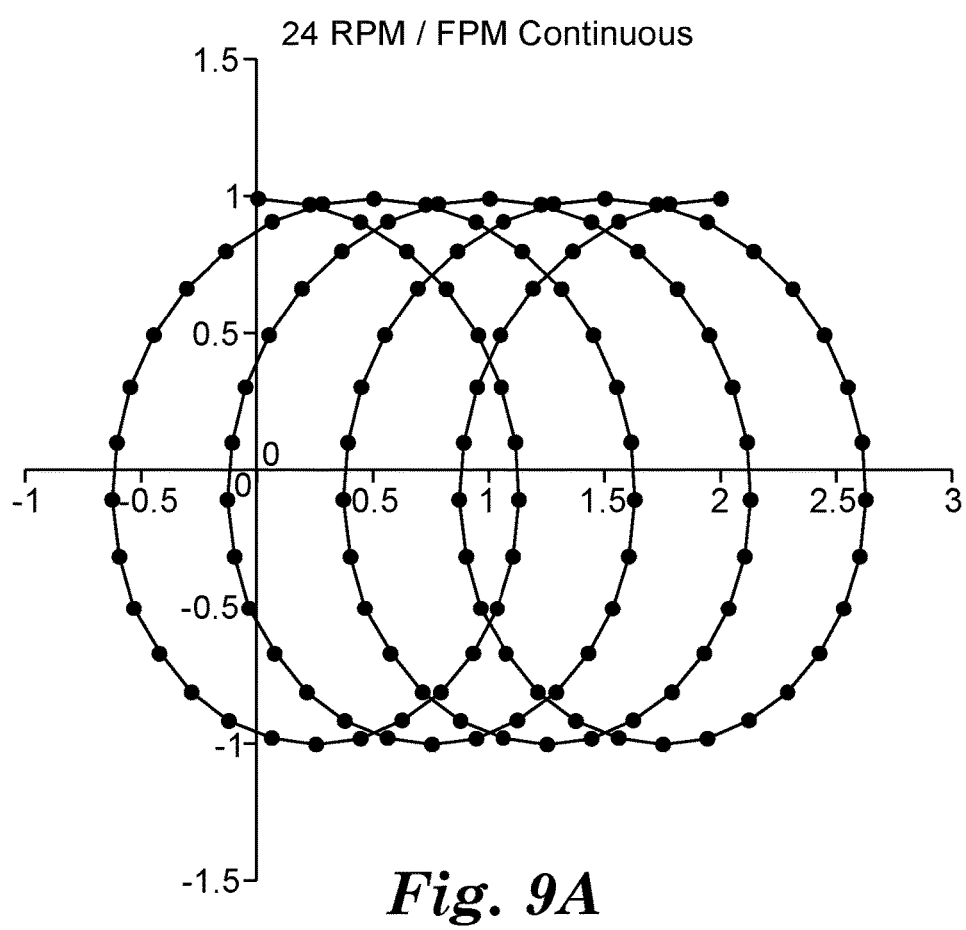
FIG. 9A is a plan view of a stylized pattern of coated material laid down on a substrate according to a first set of parameters according to certain exemplary embodiments of the present disclosure.
Figure 9B:
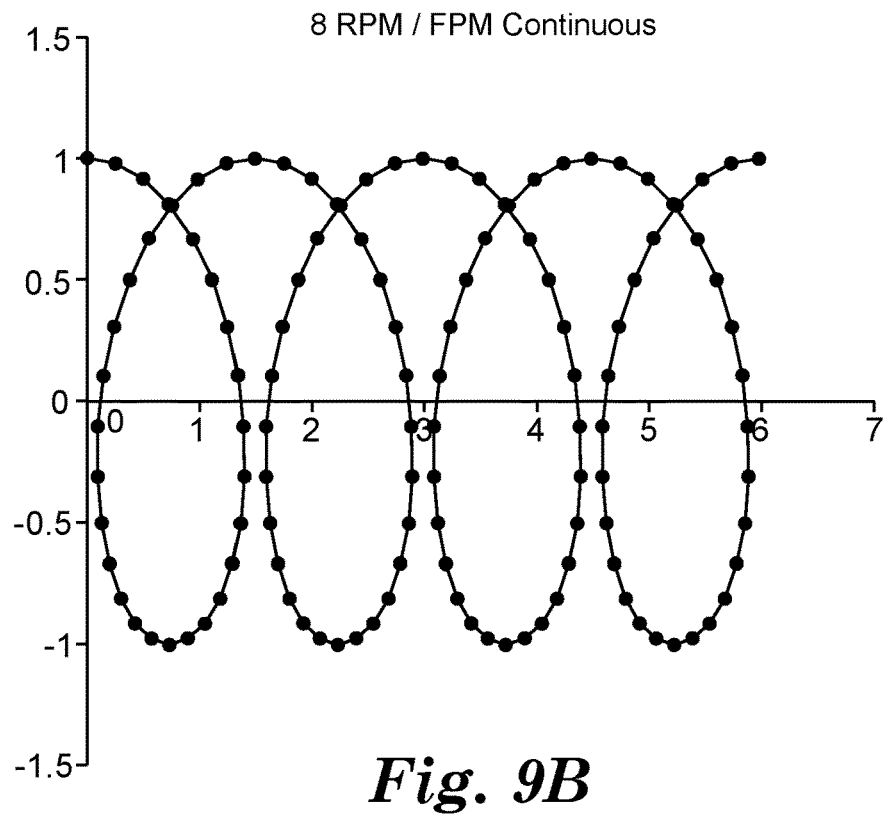
FIG. 9B is a plan view of a stylized pattern of coated material laid down on a substrate according to a second set of parameters according to further exemplary embodiments of the present disclosure.
Figure 9C:
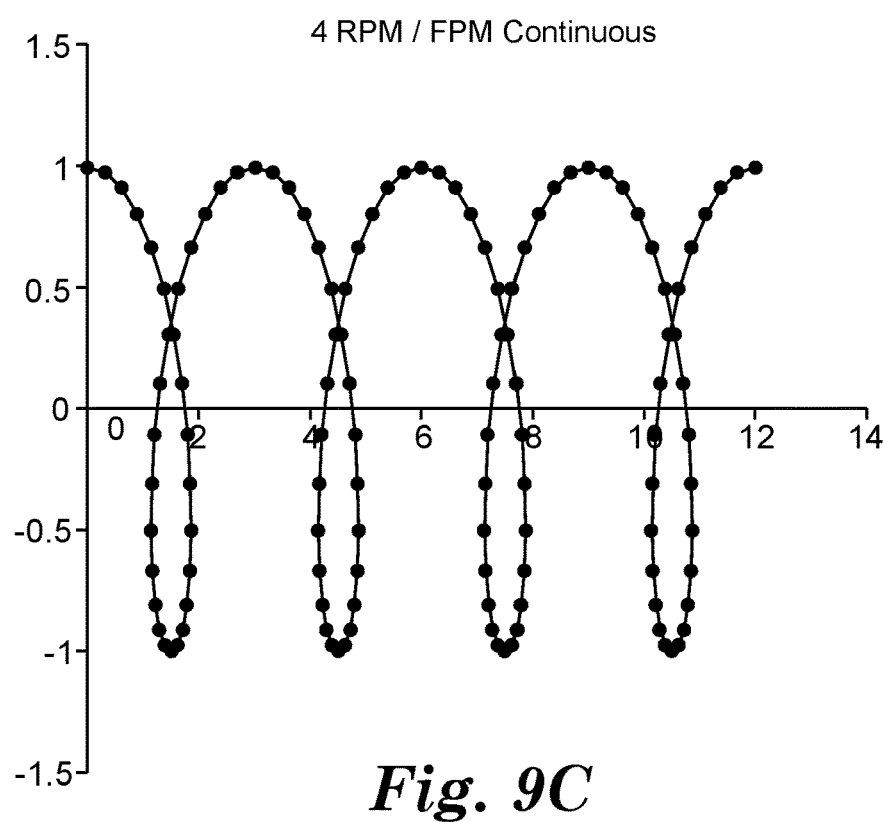
FIG. 9C is a plan view of a stylized pattern of coated material laid down on a substrate according to a third set of parameters according to additional exemplary embodiments of the present disclosure.
Figure 9D:
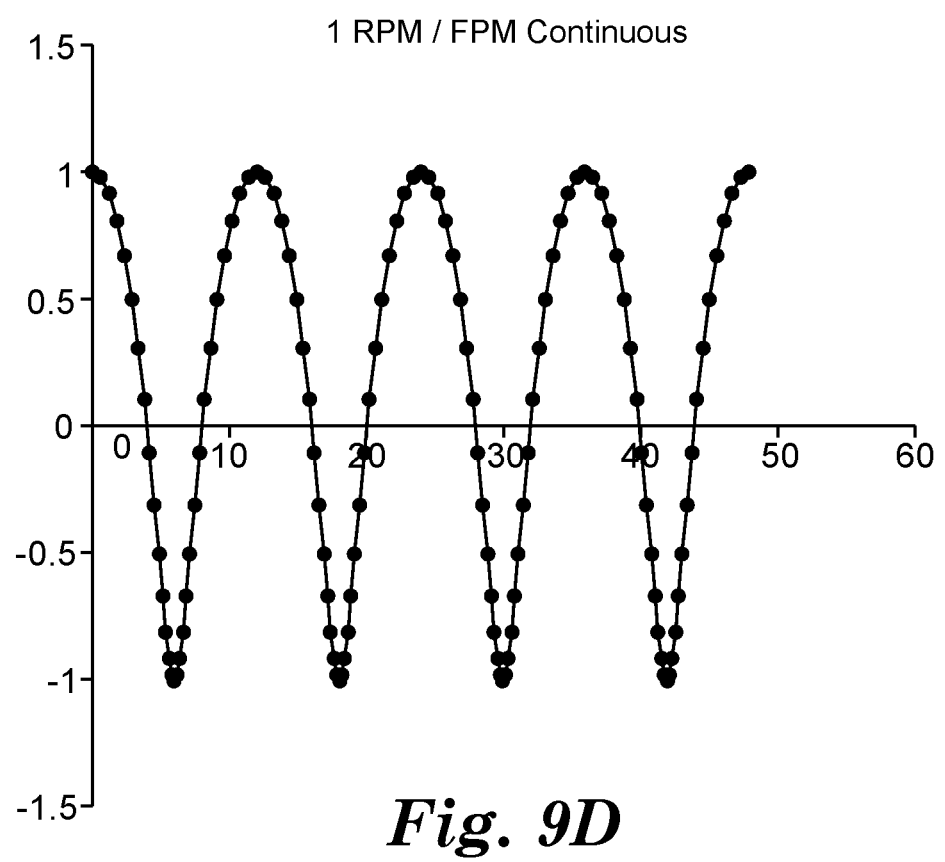
FIG. 9D is a plan view of a stylized pattern of coated material laid down on a substrate according to a fourth set of parameters according to other exemplary embodiments of the present disclosure.

Referring now to FIG. 8, a stylized front view of a mechanism to translate an alignment bar 32 in two directions simultaneously is illustrated. The alignment bar 32 is depicted with holes 32f for passing through needle tubes 26 (not shown). The ends of alignment bar 32 are connected at each end by an off-center pivot 140 to first and second cams 142 and 144. These can be rotated (e.g. in direction "R") on motor shaft 146 or 148 or both motor shafts to translate the alignment bar 32.

Referring now FIG. 9A-9D, plan views of stylized single layer patterns of coated material laid down on a substrate according to four sets of parameters is illustrated. To lay this pattern, the apparatus of FIG. 7 has been positioned relative to the substrate so that direction "D" is coincident with direction "V." As the substrate is conveyed, motor 44 and motor controller 138 are operated at different relative speeds with respect to the substrate conveyance speed, essentially drawing Lissajous figures out of coating material on the substrate. By varying the relative speeds, different useful patterns can be formed. Exemplary pattern can include ellipses (e.g. circles), arcs, polygons, Lissajous figures, or a combination thereof. In some embodiments when the pattern is a polygon, the polygon can have between 3 and 12 sides.

Exemplary Coated Articles

Figure 10:
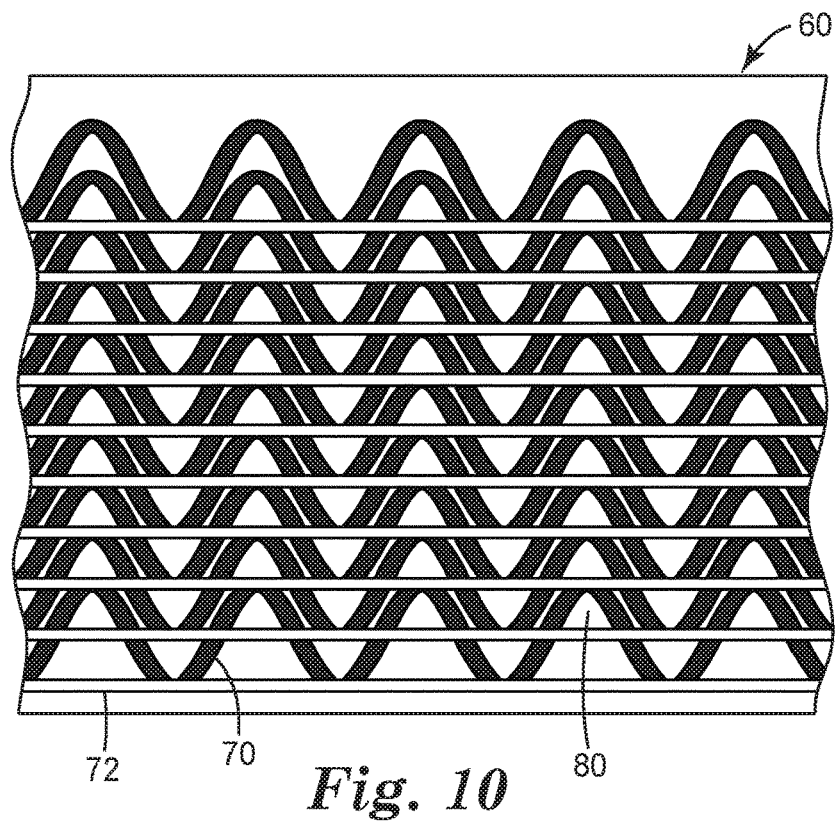
FIG. 10 is a plan view of a patterned region corresponding to a particular length of coated substrate prepared using the dual layer coating apparatus of FIG. 2.

Referring now to Referring now to FIG. 10, a plan view of length of coated substrate 60 prepared by the dual coating apparatus of FIG. 2, is illustrated. On substrate 60, sinusoidal patterns 70 laid down in a first coating material overlap straight patterns 72 laid down in a second coating material. Such an overlap is not a requirement of the disclosure even when first and second distribution manifolds are in use; the positioning and spacing of the first and second distribution outlets can be arranged so that there is no overlap. The first and the second coating materials may be same or different. In some applications, e.g. wound care products, it may be convenient to create coating-free zones completely surrounded by both the first and the second coating materials on the substrate. Zone 80 is one such zone. The first and the second coating materials may independently be an adhesive. In some applications, the first and second coating materials are both adhesives, formulated so as to particularly adhere advantageously to two distinct surface conditions. Coated articles prepared according to the current method can be an air barrier membrane, an adhesive tape, a paint masking film, or a drug delivery patch.

Figure 11:
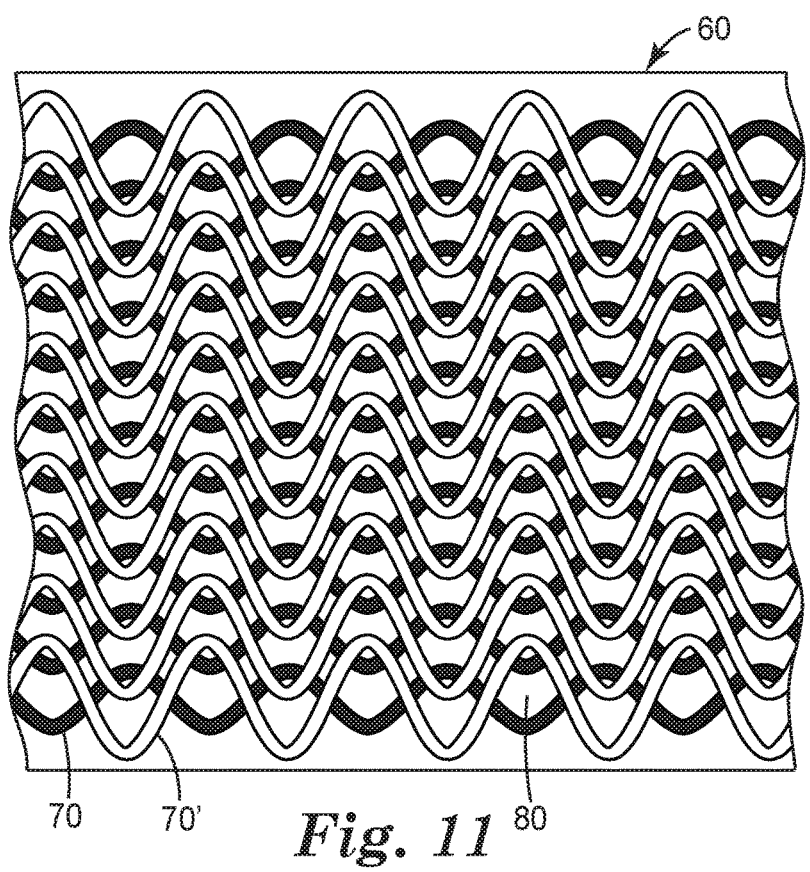
FIG. 11 is a plan view of a patterned region corresponding to a different length of coated substrate prepared using the dual layer coating apparatus of FIG. 2.

Referring now to FIG. 11, a plan view of different length of coated substrate 60 prepared by the dual coating apparatus of FIG. 2, is illustrated. On substrate 60, first sinusoidal patterns 70 laid down in a first coating material overlap second sinusoidal patterns 70' laid down in a second coating material to form a dual layer pattern. As in the embodiment of FIG. 4, such an overlap is not a requirement of the disclosure, and the first and the second coating materials may be same or different. In some applications, e.g. wound care products, it may be convenient to create coating-free zones completely surrounded by both the first and the second coating materials on the substrate. Zone 80 is one such zone.

Self-Adhering, Vapor Permeable Air Barrier Membranes

In some presently preferred embodiments, the coated article is a self-adhering, vapor permeable air barrier membrane. The vapor permeable membranes of the present disclosure are generally flexible sheets or films, normally supplied in roll form, which are permeable to the passage of water in vapor form. The sheet or film may be microporous, microperforated or some other type of vapor permeable sheet or film. A microporous sheet or film is a non-perforated continuous microfiber web with microscopic pores large enough for moisture vapor to pass through, but small enough to resist air and liquid water. Microperforated membranes depend on mechanical pin-perforations and/or film laminations to build in properties. While both of the abovementioned types of sheet or film are permeable to water vapor, a sheet or film of the microporous type is presently preferred, as this type is less permeable to the passage of water or moisture in liquid or bulk form.

Useful vapor permeable, air barrier membrane will generally be a sheet or film, typically having a width (cross-direction or XD) in the range of about 30 to 250 cm, more typically about 60 to 160 cm; and a length (machine direction or MD) of about 5 to 80 m, more typically about 15 to 40 m, and is preferably provided in roll form.

In some advantageous exemplary embodiments, the membranes are self-adhering, comprising a vapor permeable, spun-bond, non-woven polyolefin fabric substrate coated (or more correctly partially coated) on one side (i.e., on one major surface or face) with an adhesive material, preferably a pressure sensitive adhesive material, more preferably a solventless or hot melt pressure sensitive adhesive. A removable release sheet or liner may advantageously overlay and contact the adhesive in order to prevent the adhesive from adhering to the back side (i.e., non-adhesive coated) major surface of the substrate in roll form, thereby preventing "blocking" of the rolled self-adhesive membrane. The release liner is removed prior to applying the membrane to an architectural structure. Alternatively, the back side major surface of the substrate may include an overlaid or overcoated low surface energy release layer or low adhesion backsize (LAB); such embodiments are preferably used in a linerless article.

Exemplary Substrates

The utility of the present disclosure is relatively indifferent to the nature of the substrate. In some convenient embodiments, the substrate can have a non-uniform surface. In some convenient embodiments, the substrate will be a web of indefinite length material, conveyed by conventional web handling techniques. Porous and non-porous polymeric materials can be employed, including solid films, woven, and non-woven webs, paper, and fabric. The substrate may include flexible glass sheets or webs. A discussion of how flexible glass sheets or webs may be successfully handled in these sorts of embodiments can be found in co-pending and co-assigned U.S. Patent Application No. 61/593,076, titled "Composite Glass Laminate and Web Processing Apparatus," which is incorporated herein by reference in its entirety.

Vapor permeable, spun-bond, non-woven polyolefin substrate sheets are well-known and commercially available. They are typically made of polyethylene and/or polypropylene. The process of making a spun bond, non-woven polyolefin substrate sheet vapor permeable is also well known. Mukhopadhyay (Journal of Industrial Textiles 2008:37:225) provides a comprehensive review of waterproof breathable fabrics and their use.

In some exemplary embodiments, the self-adhering, vapor permeable air barrier membrane preferably meets air barrier requirements as described in ASTM E2179. The substrate sheets described in the present disclosure generally provide both water and air resistance barriers as defined by AC 38 (ICC-ES) and ASTM E 2179. In certain exemplary embodiments, the vapor permeance is preferably greater than 10 perms, more preferably greater than 15 perms, and most preferably greater than 20 perms (ASTM E96A at 75° F. or about 24° C.). It is generally a straightforward matter to select or fabricate a substrate sheet that meets the aforementioned criteria for air and water resistance, as well as vapor permeability.

In certain exemplary embodiments, the substrate is selected to be a microporous sheet or film. Suitable microporous sheets or films are preferably spunbonded or fibrous bonded polyolefin as described in U.S. Pat. Nos. 3,532,589 and 5,972,147. Preferred polyolefins are polyethylene and polypropylene. One suitable microporous sheet is commercially available under the trademark TYVEK™ from (available from E.I. DuPont deNemours Corp., Wilmington, Del.). Other suitable microporous sheets include oriented polymeric films as described in U.S. Pat. No. 5,317,035, and which comprise ethylene-propylene block copolymers. Such films are commercially available as APTRA™ films (available from BP-Amoco Corp., Atlanta, Ga.).

The sheets or films may be reinforced with various types of scrim materials or may be laminated to other vapor permeable sheets or films, such as non-woven polypropylene or non-woven polyester for the purpose of improving strength and other physical properties. In general, the self-adhering air barrier membrane will typically have a thickness of 0.001 to 0.04 inches (about 25.4-1016 micrometers), preferably 0.001 to 0.025 inches (25.4-635 micrometers).

In additional alternative exemplary embodiments, the substrate is selected to be a (co)polymeric sheet or film. Suitable (co)polymeric materials include, for example, polyesters such as polyethylene terephthalate (PET), polylactic acid (PLA) and polyethylene naphthalate (PEN); polyimides such as KAPTON™ (available from E.I. DuPont deNemours Corp., Wilmington, Del.); polycarbonates such as LEXAN (available from SABIC Innovative Plastics, Pittsfield, Mass.); cyclo olefin polymers such as ZEONEX or ZEONOR (available from Zeon Chemicals LP, Louisville, Ky.); and the like.

Exemplary Coating Materials

The utility of the present disclosure is relatively indifferent to the nature of the coating materials, provided that their viscosity allows them to be impelled from the cavity through the needle tubes to the dispensing outlets. Adhesives, low-adhesion backsizings, surface modifying agents, and barrier layers are among the coating materials that may advantageously applied by way of the disclosed method.

Some useful coating materials include monomers or oligomers which are intended to be cured after being coated on the substrate. Such materials include those capable of being conveniently cured by applying heat, actinic radiation, ionizing radiation, or a combination thereof. Any form of electromagnetic radiation may be used, for example, the liquid compositions may be cured using UV-radiation and/or heat. Electron beam radiation may also be used. The liquid compositions described above are said to be cured using actinic radiation, i.e., radiation that leads to the production of photochemical activity. For example, actinic radiation may comprise radiation of from about 250 to about 700 nm. Sources of actinic radiation include tungsten halogen lamps, xenon and mercury arc lamps, incandescent lamps, germicidal lamps, fluorescent lamps, lasers and light emitting diodes. UV-radiation can be supplied using a high intensity continuously emitting system such as those available from Fusion UV Systems.

When curing with UV radiation, photoinitiators may be used in the coating materials. Photoinitiators for free radical curing include organic peroxides, azo compounds, quinines, nitro compounds, acyl halides, hydrazones, mercapto compounds, pyrylium compounds, imidazoles, chlorotriazines, benzoin, benzoin alkyl ethers, ketones, phenones, and the like. For example, the adhesive compositions may comprise ethyl-2,4,6-trimethylbenzoylphenylphosphinate available as LUCIRIN TPOL from BASF Corp. or 1-hydroxycyclohexyl phenyl ketone available as IRGACURE 184 from Ciba Specialty Chemicals. The photoinitiator is often used at a concentration of about 0.1 to 10 weight percent or 0.1 to 5 weight percent based on the weight of oligomeric and monomer material in the polymerizable composition.

The coating materials can optionally include one or more additives such as chain transfer agents, antioxidants, stabilizers, fire retardants, viscosity modifying agents, antifoaming agents, antistatic agents and wetting agents. If color is required for the optical adhesive, colorants such as dyes and pigments, fluorescent dyes and pigments, phosphorescent dyes and pigments can be used.

Adhesives

In certain exemplary embodiments, the coating material is selected to be an adhesive material, more preferably a pressure sensitive adhesive (PSA) material, even more preferably a solventless or hot melt coatable PSA. Preferably, the substrate sheet is coated or partially coated on one side with a pressure sensitive adhesive. Any pressure sensitive adhesive used to adhere membranes to architectural structures (e.g., buildings) may be used. These include both vapor permeable and vapor impermeable pressure sensitive adhesives. An example of the latter is a rubber modified asphalt (bitumen) pressure sensitive adhesive or a synthetic rubber pressure sensitive adhesive. Such pressure sensitive adhesives are well known in the art.

Preferably, the adhesive is selected to be a solventless or hot melt adhesive; however, in some exemplary embodiments, solvent based adhesives, water based adhesives, or other types of adhesives, such as, for example, radiation-cured, e.g., ultraviolet (UV) radiation or electron-beam cured (co)polymers resulting from polymerizable monomers or oligomers) may be used. The applied adhesive is preferably tacky (i.e. sticky) and pressure sensitive.

Suitable hot melt adhesives may contain such ingredients as (co)polymers such as butyl rubber, styrene-butadiene-styrene (SBS), styrene-isoprene-styrene (SIS), styrene butadiene (SB), styrene-ethylene-butadiene-styrene (SEBS) and ethylenevinylacetate (EVA); resins such as those of the hydrocarbon and rosin types, natural and petroleum waxes, oils, bitumen and others.

Solvent-based adhesives may contain ingredients such as those listed above, dissolved or dispersed in a solvent vehicle.

Water based adhesives would normally be based on emulsions of (co)polymeric materials.

Suitable (co)polymeric materials include vinyl acetate and (meth)acrylic homopolymers and copolymers such as vinyl acetate acrylic, ethylene vinyl acetate as well as styrene acrylic, vinyl chloride acrylic, vinyl versatate and others.

From a production standpoint, the preferred adhesives are of the hot melt type which are simply melted for application and need not emit solvent which is an environmental pollutant and may require re-condensation.

Water based adhesives may have the disadvantage that they generally require the additional use of drying ovens or heat lamps to evaporate the water.

If a vapor permeable pressure sensitive adhesive is used, the substrate sheet may be completely coated on one side. If a vapor impermeable pressure sensitive adhesive is used, then the substrate sheet may be only partially coated with adhesive, typically in the range of about 20-85%, more typically about 30-80%, most typically 40-70%, of the surface area of the sheet. In other words, at least 15-80%, preferably 20-70%, most preferably 30-60%, of the surface area of the substrate sheet should be adhesive-free in order to maintain sufficient vapor permeability of the membrane.

The adhesive may suitably be applied at a thickness of 0.001 inches to 0.1 inch (about 2.54-254 mm), but is preferably applied at a thickness of 0.003 inches to 0.025 inches (about 7.62-63.5 mm) and most preferably at a thickness of 0.005 inches to 0.02 inches (about 12.7-50.8 mm).

As noted above, the adhesive may be protected with a strippable release sheet or liner to enable packaging in rolls. Suitable release sheets are paper or (co)polymer film sheets with an overlaying, low surface energy (e.g., silicone) release surface coating.

Adhesive Patterns

To retain a desired level of water vapor permeance in the adhesive coated membrane, the adhesive is preferably applied to the vapor permeable membrane in a non-continuous film in order to leave parts, or spots or zones of the substrate surface uncoated with adhesive. In general, the adhesive film forms an adhesive sea on the membrane surface, with a multitude of membrane islands, surrounded by but not covered by the adhesive sea.

In order to prevent the lateral movement of air between the membrane and the substrate to which it is bonded, and through lap joints of the membrane, the adhesive coated areas of the membrane can be made to intersect to isolate the uncoated areas, thereby eliminating channels through which air can laterally move. This can be achieved by any number of patterns, such as intersecting circles with adhesive free centers, intersecting squares or rectangles of adhesive, intersecting strips in a checkered pattern, etc.

The adhesive may suitably be applied so as to cover 5% to 99% of the area of one side of the membrane, but is preferably applied to cover between 25% and 90% of the area, and most preferably between 50% and 80% of the area, to obtain the optimum balance of adhesion and vapor permeance for the sheet.

Partial coatings of adhesive may be applied in a random fashion or in a specific pattern. Some exemplary partial coatings of adhesive are described, for example, in U.S. Pat. Nos. 3,039,893, 3,426,754, 5,374,477, 5,593,771, 5,895, 301, 6,495,229, and 6,901,712.

The operation of exemplary embodiments of the present disclosure will be further described with regard to the following non-limiting detailed Examples. These examples are offered to further illustrate the various specific and preferred embodiments and techniques. It should be understood, however, that many variations and modifications may be made while remaining within the scope of the present disclosure.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Materials

All parts, percentages, ratios, and the like in the Examples and the rest of the specification are by weight, unless noted otherwise. Solvents and other reagents used may be obtained from Sigma-Aldrich Chemical Company (Milwaukee, Wis.) unless otherwise noted.

Example 1

An apparatus generally as depicted in FIG. 1 was prepared. The dispensing outlets of the needle tubes were positioned adjacent to a conventional web handling line threaded up with a polyurethane (Estane, available from The Lubrizol Corporation of Wickliffe, Ohio) coated polyester nonwoven web (Reemay from Fiberweb Inc. of Old Hickory, Tenn.) of indefinite length. The web was conveyed past the dispensing openings in the direction of the indefinite length at a line speed of 9 feet/minute (2.74 m/min).

A first coating material was prepared using 99 parts isooctyl acrylate (IOA), 1 part acrylic acid (AA) and 0.04 parts 2,2-dimethoxy-2-phenylacetophenone photoinitiator (Irgacure 651, available from BASF). This mixture was partially polymerized under a nitrogen atmosphere by exposure to ultraviolet radiation to provide a coatable syrup having a viscosity of about 4000 cps. An additional 0.26 parts of Irgacure 651 photoinitiator, 0.13 parts of 2,6-bis-trichoromethyl-6-(3,4-dimethoxyphenyl)-s-triazine and 6 parts Foral 85LB tackifier (a glycerol ester of highly hydrogenated wood rosin available from Pinova Inc.) were added to the syrup and mixed until all of the components had completely dissolved.

The first coating material was dispensed from the dispensing outlets onto the moving web while the needle tubes were oscillated at a rate of 6.7 Hz at a peak-to-peak amplitude of 25 mm. The pressure in the cavity of the distribution manifold was controlled to deliver the coating material at a coat weight of 32 grains/4"×6" (0.013 g/cm$^2$). The first coating material was then exposed to ultraviolet radiation having a spectral output from 300-400 nm with a maximum at 351 nm in a nitrogen-rich environment. An intensity of about 9.0 mW/cm$^2$ was used during the exposure time, resulting in a total energy of 1800 mJ/cm$^2$. A pattern of pressure sensitive adhesive laid down in parallel sinusoids aligned in the longitudinal direction of the web was thus created.

Example 2

The set-up for this Example is generally similar to that of Example 1, except that a coating apparatus generally as depicted in FIG. 2 was employed. The coating material described in Example 1 was provided to both distribution manifolds, and the first dispensing outlets were reciprocated at a rate of 2.5 Hz, while the second dispensing outlets were kept stationary. A pattern generally as depicted in FIG. 10 was laid down on the substrate.

Example 3

The set-up for this Example is generally similar to that of Example 2, except that the first dispensing outlets were reciprocated at a rate of 2.5 Hz with an amplitude of 25 mm, while the second dispensing outlets were also reciprocated at a rate of 2.5 Hz with an amplitude of 12.5 mm. A pattern generally as depicted in FIG. 11 was laid down on the substrate.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about."

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

The invention claimed is:

1. A method of applying a coating material to a substrate to produce a pre-determined pattern of the coating material on the substrate, comprising:
   providing a first distribution manifold having a cavity and a first plurality of dispensing outlets in fluid communication with the cavity;
   providing a second distribution manifold having a cavity and a second plurality of dispensing outlets in fluid communication with the cavity, wherein the second plurality of dispensing outlets is interleaved with the first plurality of dispensing outlets; and
   creating relative motion between a substrate and the first and second plurality of dispensing outlets in a first direction;

dispensing a first coating material from the first plurality of dispensing outlets onto the substrate in a predetermined pattern while maintaining the relative motion, and simultaneously translating the first plurality of dispensing outlets in a second direction non-parallel to the first direction; and dispensing a second coating material from the second plurality of dispensing outlets onto the substrate in a predetermined pattern while maintaining the relative motion, and simultaneously translating the second plurality of dispensing outlets in a direction non-parallel to the first direction.

2. The method according to claim 1 wherein the first plurality of dispensing outlets are translated in a third direction non-parallel to the first direction and non-parallel to the second direction while dispensing coating material from the first plurality of dispensing outlets.

3. The method according to claim 2 wherein the second plurality of dispensing outlets are translated in a direction non-parallel to the first direction and non-parallel to the second direction while dispensing coating material from the second plurality of dispensing outlets.

4. The method according to claim 2 wherein the second and third directions are substantially orthogonal to each other.

5. The method according to claim 2 wherein the first direction is a machine direction, and the second direction is a cross direction.

6. The method according to claim 5, wherein the third direction is substantially orthogonal to a major surface of the substrate.

7. The method according to claim 1 wherein the first and second coating materials are different materials.

* * * * *

UNITED STATES PATENT AND TRADEMARK OFFICE
CERTIFICATE OF CORRECTION

Page 1 of 1

PATENT NO. : 10,357,795 B2
APPLICATION NO. : 15/755114
DATED : July 23, 2019
INVENTOR(S) : Jonathan O'Hare It is certified that error appears in the above-identified patent and that said Letters Patent is hereby corrected as shown below:

In the Specification

<u>Column 4</u>
Line 49, After "coating" insert -- . --.

<u>Column 9</u>
Line 33, Delete "22d." and insert -- 22d'. --, therefor.

<u>Column 10</u>
Line 14, Delete "time," and insert -- time. --, therefor.
Line 27, Delete "FIG." and insert -- FIGS. --, therefor.

<u>Column 11</u>
Line 65, After "Apparatus,"" insert -- (attorney docket number 69517US002), --.

<u>Column 15</u>
Line 45, Delete "trichoromethyl" and insert -- trichloromethyl --, therefor.

Signed and Sealed this
Seventh Day of July, 2020

Andrei Iancu
*Director of the United States Patent and Trademark Office*